United States Patent
Wu

(10) Patent No.: US 9,246,346 B2
(45) Date of Patent: Jan. 26, 2016

(54) POWER-SAVING DEVICE

(71) Applicant: WISTRON CORP., New Taipei (TW)

(72) Inventor: Te-Lung Wu, New Taipei (TW)

(73) Assignee: Wistron Corp., New Taipei (TW)

( * ) Notice: Subject to any disclaimer, the term of this patent is extended or adjusted under 35 U.S.C. 154(b) by 362 days.

(21) Appl. No.: 14/045,730

(22) Filed: Oct. 3, 2013

(65) Prior Publication Data

US 2014/0246904 A1 Sep. 4, 2014

(30) Foreign Application Priority Data

Mar. 4, 2013 (TW) .............................. 102107436 A

(51) Int. Cl.
*H02J 7/00* (2006.01)
*H02J 9/00* (2006.01)

(52) U.S. Cl.
CPC ................. *H02J 7/0068* (2013.01); *H02J 9/00* (2013.01); *H02J 9/005* (2013.01); *Y10T 307/344* (2015.04); *Y10T 307/516* (2015.04); *Y10T 307/625* (2015.04)

(58) Field of Classification Search
CPC ........... H02J 7/0068; H02J 9/005; H02J 9/00; Y10T 307/516; Y10T 307/625
USPC .......................... 307/23, 43, 46, 66
See application file for complete search history.

(56) References Cited

U.S. PATENT DOCUMENTS

2012/0256596 A1 10/2012 Wada et al.
2013/0020995 A1* 1/2013 Kim .......................... G06F 1/32
320/111

FOREIGN PATENT DOCUMENTS

CN 2509814 Y 9/2002

OTHER PUBLICATIONS

Taiwan Patent Office, Office Action, Patent Application Serial No. 102107436, Oct. 28, 2014, Taiwan.

* cited by examiner

*Primary Examiner* — Carlos Amaya

(57) ABSTRACT

A power saving device includes a first switch coupled between an input node and an output node, wherein the input node is coupled to a power source and the output node is coupled to an electronic device, a detection unit detecting the magnitude of a current, a charge unit coupled to the output node, wherein the charge unit correspondingly generates a detection signal in response to magnitude of the current, a battery pack coupled to the charge unit, a second switch disposed between the output node and the battery pack and a controller. When magnitude of the current in response to the detection signal is lower than a threshold current and battery capacity of the battery back is higher than a predetermined capacity, the controller outputs a set of control signals to turn off the first switch and turn on the second switch.

4 Claims, 2 Drawing Sheets

POWER-SAVING DEVICE

CROSS REFERENCE TO RELATED APPLICATIONS

This Application claims priority of Taiwan Patent Application No. 102107436, filed on Mar. 4, 2013, the entirety of which is incorporated by reference herein.

BACKGROUND OF THE INVENTION

1. Field of the Invention

The present invention is related to a power-saving device and in particular to a power saving device for reducing power consumption of the electronic system.

2. Description of the Related Art

In order to prevent pollution, reducing power consumption is needed. Electronic products today are designed to comply with environmental regulations in a number of countries and regions in the world.

In the process of improving power consumption of the electronic system, as the electronic system is still connected to the power source, it is hard to reduce power consumption when the electronic system is in the standby mode (or the shutdown mode). With respect to today's technologies, there are only two ways to reduce power consumption. The first one is to reduce power consumption of the chips in the standby mode (or in the shutdown mode) by using a low-power chip. The second one is to enhance the conversion efficiency of the output power module by using the high-efficiency output power module. However, the low-power chip and the high-efficiency output power module will increase cost.

Therefore, it is needed to propose a new power saving device to reduce power consumption of the electronic system when operating in the standby mode (or the shutdown mode) without drastically increasing the cost.

BRIEF SUMMARY OF THE INVENTION

An aspect of the present invention is to provide a power saving device for reducing power consumption under the standby mode (or the shutdown mode).

In accordance with disclosures of the present invention, a power saving device is provided. The power saving device includes a first switch, a detection unit, a charge unit, a battery pack, a second switch and a controller.

The first switch is coupled between an input node and an output node, wherein the input node is coupled to a power source and the output node is coupled to an electronic device. The detection unit detects the magnitude of the current which is supplied from the power source and flows between the input node and the output node. The charge unit is coupled to the output node, wherein the charge unit correspondingly generates a detection signal according to the magnitude of the current detected by the detection unit. The battery pack is coupled to a charge output terminal of the charge unit. The second switch is disposed between the output node and the battery pack. The controller is coupled to the charge unit and the battery pack for receiving the detection signal and detecting the battery capacity of the battery pack, respectively. When the magnitude of the current in response to the detection signal is lower than a threshold current and the battery capacity is higher than a predetermined capacity, the controller outputs a set of control signals to turn off the first switch and turn on the second switch.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
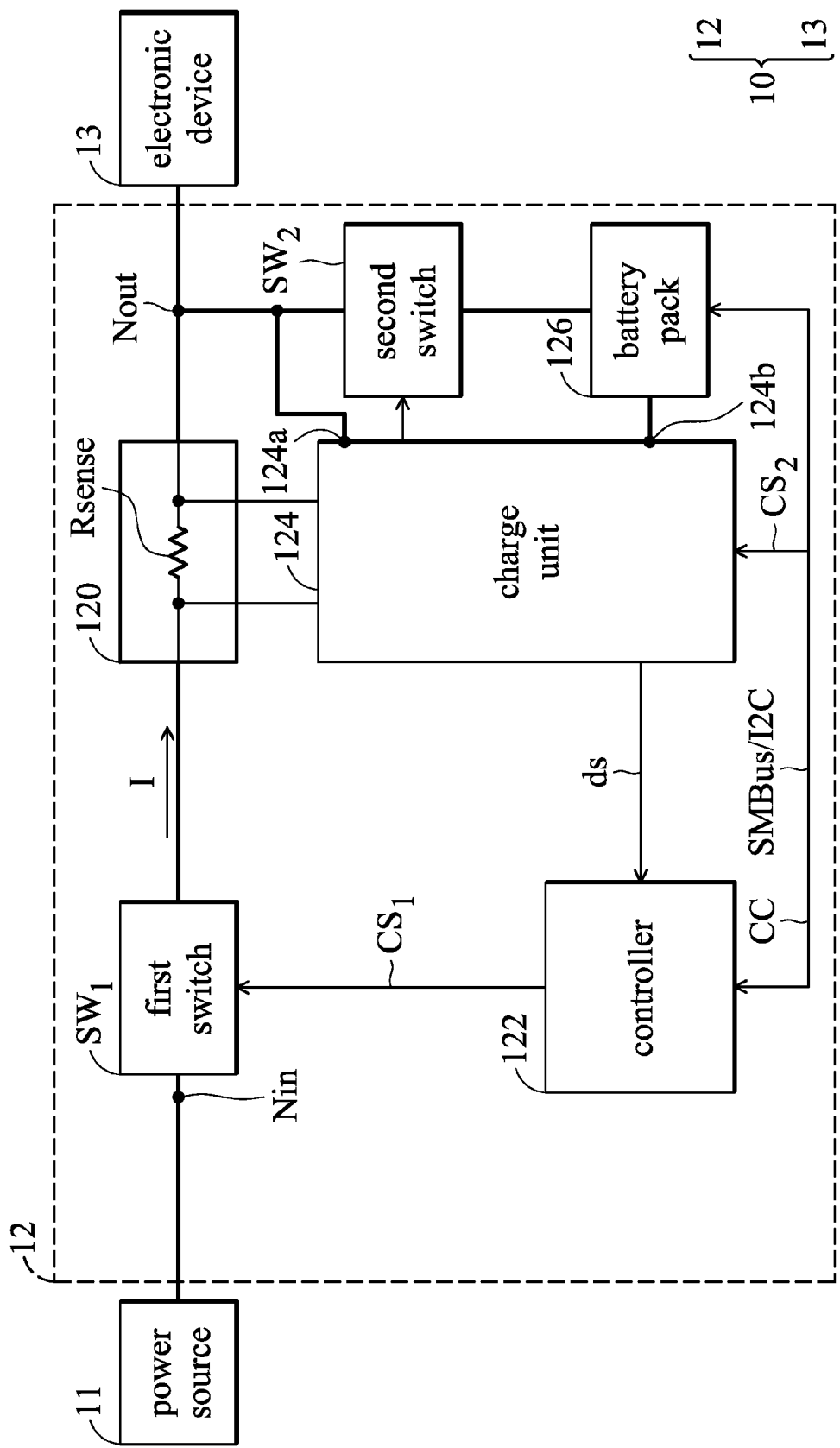
FIG. 1 is a circuit block diagram illustrating a power saving device that reduces power consumption of an electronic system when the electronic system is in the standby mode (or in the shutdown mode), according to an embodiment of the invention.

FIG. 1 is a circuit block diagram illustrating a power saving device 12 that reduces power consumption of an electronic system 10 when the electronic system 10 is in the standby mode (or the shutdown mode), according to an embodiment of the invention. Exemplary embodiments of the present invention will be described in detail below. As shown in FIG. 1, the electronic system 10 includes a power saving device 12 and an electronic device 13. The power saving device 12 is coupled between a power source 11 and the electronic device 13 so as to reduce power consumption of the electronic system 10 when the electronic system 10 is in the standby mode (or the shutdown mode). With regard to the electronic device 13, the electronic device 13 may include various devices. For example, the electronic device 13 includes a power source module (not shown in FIG. 1) and a main device (not shown in FIG. 1). When the electronic system is in a normal working state, the power source module receives electric power supplied from the power source 11 via the power saving device 12 and converts the voltage value of the received electric power into one of the various voltage values (such as ±1.5V, ±3.3V, ±5V, ±12V, etc.) which the main device needs. It is noted that the above-mentioned instance is used only for the purpose of exemplification of the electronic device 13, rather than being used to limit the implementation of the present invention.

As shown in FIG. 1, the power saving device 12 includes a first switch $SW_1$, a second switch $SW_2$, a detection unit 120, a controller 122, a charge unit 124 and a battery pack 126. The first switch $SW_1$ is coupled between an input node $N_{in}$ and an output node $N_{out}$. The input node $N_{in}$ is coupled to the power source 11 and the output node $N_{out}$ is coupled to the electronic device 13. With respect to the detection unit 120, the detection unit 120 is used for detecting the magnitude of a current I, wherein the current I is supplied from the power source 11 and flows between the input node $N_{in}$ and the output node $N_{out}$, as depicted in FIG. 1. In this embodiment, a sensing resistor Rsense (the resistor value is R) serves as the detection unit 120. The sensing resistor Rsense is coupled between the first switch $SW_1$ and the output node $N_{out}$ to detect the magnitude of the current I, wherein the current I flows into the sensing resistor Rsense. Any suitable detection components may be used for detecting the magnitude of the current I. Thus, the above-mentioned instance is used only for the purpose of exemplification of the detection unit, rather than being used to limit the implementation of the present invention.

In addition, with regard to the charge unit 124, a power-input terminal 124a of the charge unit 124 is coupled to the output node $N_{out}$ for receiving electric power to generate the charging voltage, wherein electric power is provided from the power source 11. The battery pack 126 coupled to a charge-output terminal 124b is charged by the charging voltage. The charge unit 124 is further coupled to the detection unit 120 for detecting the voltage (I×Rsense) across the sensing resistor Rsense so as to generate a detection signal ds in response to the magnitude of the current I. The second switch $SW_2$ is disposed between the output node $N_{out}$ and the battery pack 126. The controller 122 is coupled to the charge unit 124 for receiving the detection signal ds. The controller 122 is coupled to the charge unit 124 and the battery pack 126 via a bus CC, such as SMBus/I2C. Therefore, SMBus/I2C is used for transferring the battery-capacity information of the battery pack 126 to the controller 122. Additionally, the bus CC is also used for transferring instructions issued by the controller 122 to the charge unit 124.

Referring to FIG. 1, when the electronic system 10 works normally (i.e. not in the standby mode or the shutdown mode), the controller 122 turns on the first switch $SW_1$ and the controller 122 turns off the second switch $SW_2$ via the charge unit 124. Therefore, the power source 11 can provide electric power for the electronic device 13 and charge the battery pack 126 via the charge unit 124.

Alternatively, when the electronic system 10 is in the standby mode or is in the shutdown mode, the current requirement supplied for the electronic system 10 goes down. Therefore, magnitude of the current I detected by the charge unit 124 correspondingly descends. The detection signal ds generated by the charge unit 124 varies in response to the variation of magnitude of the current I. When magnitude of the current I in response to the detection signal ds is lower than a threshold current and the battery capacity of the battery pack 126 is higher than a predetermined capacity, the controller 122 directly transmits a control signal $CS_1$ to the first switch $SW_1$ and thereby turns off the first switch $SW_1$, and transmits a control signal $CS_2$ to the charge unit 124 and thereby turns on the second switch $SW_2$ via the bus CC, such as SMBus/I2C.

Figure 2:
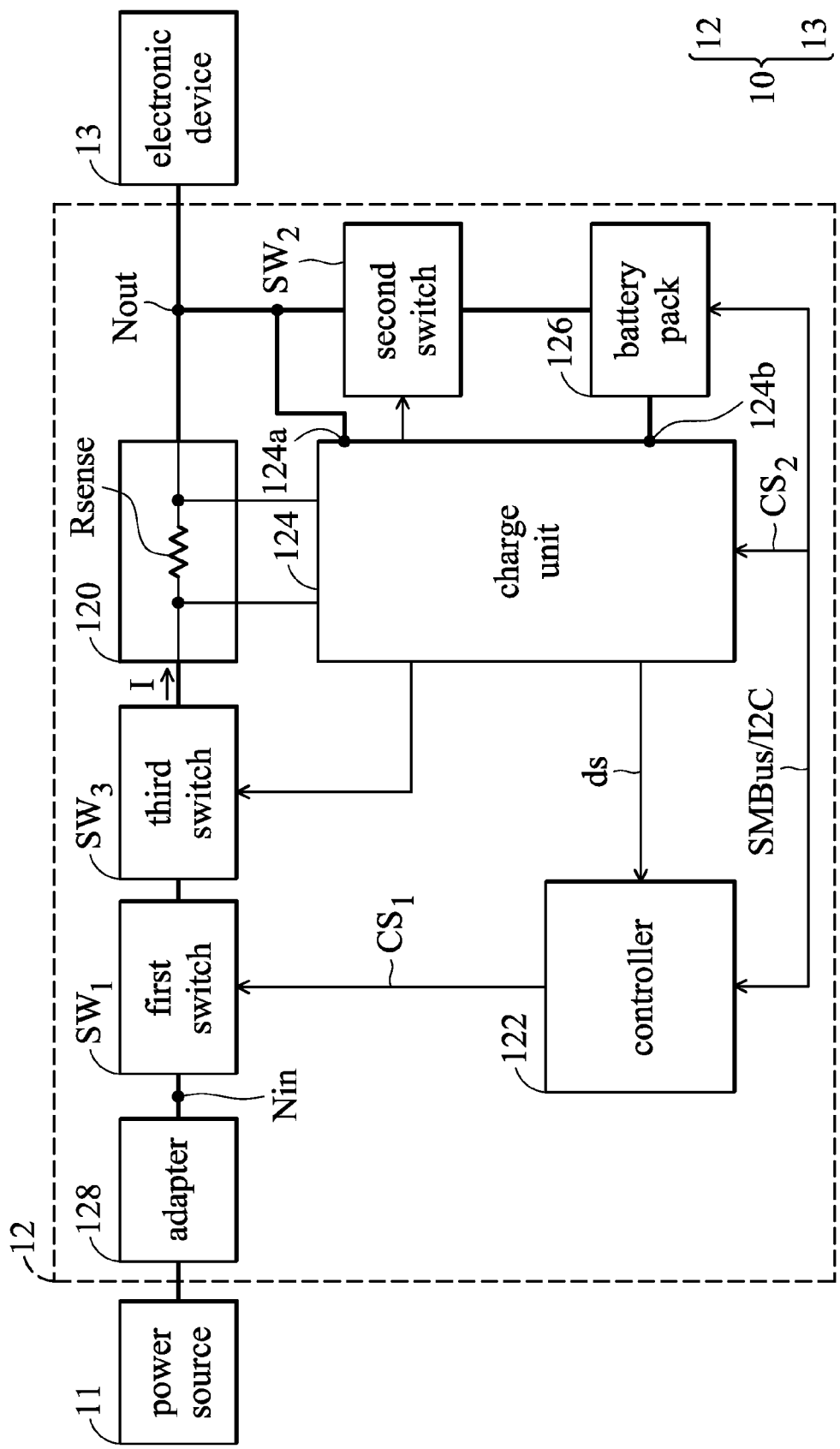
FIG. 2 is a circuit block diagram illustrating a power saving device that reduces power consumption of the electronic system when the electronic system is in the standby mode (or the shutdown mode), according to another embodiment of the invention.

FIG. 2 is a circuit block diagram illustrating a power saving device that reduces power consumption of the electronic system when the electronic system is in the standby mode (or in the shutdown mode), according to another embodiment of the invention. Compared with FIG. 1, the power saving device 12 further includes an adaptor 128 and a third switch $SW_3$. The adapter 128 is coupled between the input node $N_{in}$ and the power source 11. The third switch $SW_3$ is coupled between the first switch $SW_1$ and the output node $N_{out}$. When the magnitude of the current I corresponding to the detection signal ds is lower than the threshold current and battery capacity of the battery pack 126 is higher than the predetermined capacity, the controller 122 directly transmits a control signal $CS_1$ to the first switch $SW_1$ and hereby turns off the first switch $SW_1$, and also transmits a control signal $CS_2$ to the charge unit 124 and turns off the third switch $SW_3$ via the bus CC, such as SMBus/I2C. Additionally, the controller 122 transmits a control signal $CS_2$ to the charge unit 124 and turns on the second switch $SW_2$ via the bus CC, such as SMBus/I2C, as well.

Referring to FIG. 2, the first switch $SW_1$ or the third switch $SW_3$ is turned off to cut off the path of electric power provided from the power source 11 when the electronic system 10 is in the standby mode, resulting in reduction of power consumption. Moreover, the second switch $SW_2$ is turned on, so that the battery pack 126 is able to provide the electronic device 13 with electric power.

In an embodiment of the invention, the battery pack 126 is fully charged when the battery capacity of the battery pack 126 is higher than the certain percentage of the rated capacitance of the battery pack 126, typically 95% of the rated capacitance. The electronic system 10 is in the standby mode or in the shutdown mode when the magnitude of the current I detected by the detection unit 120 is lower than a certain current magnitude, typically 128 mA. Therefore, the controller 122 transmits a set of control signals CS1 and CS2 to turn off the first switch $SW_1$ or the third switch $SW_3$ and turn on the second switch $SW_2$ when magnitude of the current I in response to the detection signal ds is lower than 128 mA and capacity of the battery pack 126 is higher than the 95% of rated capacitance of the battery pack 126. Thereafter, the battery pack 126 rather than the power source 11 is used for providing the electronic system 10 with electric power when the electronic system 10 is in the standby mode or in the shutdown mode.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power saving device, comprising:
    a first switch, coupled between an input node and an output node, wherein the input node is coupled to a power source and the output node is coupled to an electronic device;
    a detection unit, detecting the magnitude of a current which is supplied from the power source and flows between the input node and the output node;
    a charge unit, coupled to the output node, wherein the charge unit correspondingly generates a detection signal according to magnitude of the current detected by the detection unit;
    a battery pack, coupled to a charge output terminal of the charge unit;
    a second switch, disposed between the output node and the battery pack; and
    a controller, coupled to the charge unit and the battery pack for receiving the detection signal and detecting battery capacity of the battery pack respectively;
    when magnitude of the current in response to the detection signal is lower than a threshold current and battery capacity of the battery pack is higher than a predetermined capacity, the controller outputs a set of control signals to respectively turn off the first switch and turn on the second switch.

2. The power saving device as claimed in claim 1, further comprising:
    a third switch, coupled between the first switch and the output node;
    when magnitude of the current in response to the detection signal is lower than the threshold current and battery capacity of the battery pack is higher than the predetermined capacity, the controller outputs the set of control signals to turn off the third switch.

3. The power saving device as claimed in claim 1, further comprising:
an adaptor, coupled between the input node and the power source.

4. The power saving device as claimed in claim 2, wherein when magnitude of the current in response to the detection signal is lower than the threshold current and battery capacity of the battery pack is higher than the predetermined capacity, the controller transmits the set of control signals to respectively turn on the second switch and turn off the third switch via the charge unit.

* * * * *